(12) United States Patent
Wang et al.

(10) Patent No.: US 8,779,292 B2
(45) Date of Patent: Jul. 15, 2014

(54) SUBSTRATE AND SUBSTRATE BONDING DEVICE USING THE SAME

(75) Inventors: Chung-Chuan Wang, Hsin-Chu (TW); Chi-Hsiang Huang, Hsin-Chu (TW); Tzu-Hui Hsu, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 630 days.

(21) Appl. No.: 12/950,344

(22) Filed: Nov. 19, 2010

(65) Prior Publication Data
US 2011/0155460 A1 Jun. 30, 2011

(30) Foreign Application Priority Data

Dec. 30, 2009 (TW) ................................ 98145941 A (51) Int. Cl.
*H01R 4/00* (2006.01)
*H02G 3/06* (2006.01)
*H02G 15/08* (2006.01)
*H01B 7/08* (2006.01)
*H05K 1/00* (2006.01)

(52) U.S. Cl.
USPC ................ 174/88 R; 174/117 F; 174/117 FF; 174/254

(58) Field of Classification Search
CPC ..... H05K 3/3431; H05K 3/361; H05K 3/366; H01R 12/59; H01R 12/61; H01R 12/63
USPC ....... 174/71 R, 72 TR, 117 A, 117 F, 117 FF, 174/117 R, 254, 88 R; 228/57
See application file for complete search history.

(56) References Cited

U.S. PATENT DOCUMENTS

| | | | | |
|---|---|---|---|---|
| 4,010,488 A | * | 3/1977 | Gruszka et al. | 174/536 |
| 4,795,079 A | * | 1/1989 | Yamada | 174/88 R |
| 4,900,264 A | * | 2/1990 | Bennett et al. | 439/391 |
| 5,315,070 A | * | 5/1994 | Maiwald | 174/250 |
| 6,020,559 A | * | 2/2000 | Maeda | 174/117 F |
| 6,252,176 B1 | * | 6/2001 | Kuramochi et al. | 174/255 |
| 6,506,978 B1 | * | 1/2003 | Furihata | 174/254 |
| 6,521,997 B1 | * | 2/2003 | Huang et al. | 174/255 |
| 6,633,002 B2 | * | 10/2003 | Atou | 174/117 F |
| 7,000,312 B2 | * | 2/2006 | Fukunabe et al. | 174/260 |

(Continued)

FOREIGN PATENT DOCUMENTS

| | | |
|---|---|---|
| CN | 101150111 A | 3/2008 |
| TW | 503494 B | 9/2002 |

(Continued)

Primary Examiner — Chau N Nguyen
Assistant Examiner — Roshn Varghese
(74) Attorney, Agent, or Firm — Rabin & Berdo, P.C.

(57) ABSTRACT

A substrate and a substrate bonding device using the same are provided. The substrate includes a base, upper and lower metal layers, and upper and lower covering layers. The base has an upper surface, a lower surface and a through-hole passing there through, wherein the upper and lower covering layers respectively covers the upper and lower metal layers respectively disposed on the upper and lower surfaces of the base. The lower metal layer has an electrical bonding portion and a strengthening bonding portion insulated with each other. The strengthening bonding portion enhances the bonding strength between the substrate and another substrate. The upper metal layer is electrically connected to the electrical bonding portion via the through hole. The lower covering layer exposes the electrical bonding portion and the strengthening bonding portion so as to be respectively connected with two bonding portions of the another substrate.

23 Claims, 4 Drawing Sheets

(56) References Cited

U.S. PATENT DOCUMENTS

| | | | |
|---|---|---|---|
| 7,012,814 B2* | 3/2006 | Sugimoto et al. | 361/803 |
| 7,205,485 B2* | 4/2007 | Chiu et al. | 174/260 |
| 7,265,804 B2* | 9/2007 | Chen | 349/150 |
| 7,268,437 B2* | 9/2007 | Liu | 174/250 |
| 7,292,055 B2* | 11/2007 | Egitto et al. | 324/754.18 |
| 7,304,247 B2* | 12/2007 | Birgel et al. | 174/260 |
| 7,381,066 B2* | 6/2008 | Higashiguchi et al. | 439/83 |
| 7,511,965 B2* | 3/2009 | Fujii et al. | 174/252 |
| 2003/0184986 A1* | 10/2003 | Soga et al. | 361/767 |
| 2004/0036833 A1* | 2/2004 | Monzen | 349/158 |
| 2006/0086532 A1* | 4/2006 | Ho et al. | 174/250 |
| 2007/0246811 A1 | 10/2007 | Tsai et al. | |
| 2008/0100763 A1* | 5/2008 | Park | 174/250 |

FOREIGN PATENT DOCUMENTS

| | | |
|---|---|---|
| TW | 559435 Y | 10/2003 |
| TW | I303541 | 3/2007 |
| TW | I294654 | 3/2008 |
| TW | 200815829 | 4/2008 |
| TW | 200847863 | 12/2008 |

* cited by examiner

FIG. 5B

SUBSTRATE AND SUBSTRATE BONDING DEVICE USING THE SAME

This application claims the benefit of Taiwan application Serial No. 98145941, filed Dec. 30, 2009, the subject matter of which is incorporated herein by reference.

BACKGROUND OF THE INVENTION

1. Field of the Invention

The invention relates in general to a substrate and a substrate bonding device using the same, and more particularly to a substrate with at least double-layered metal layer and a substrate bonding device using the same.

2. Description of the Related Art

The printed circuit board (PCB) is a supporter of electronic elements and provides the connection of wires between the electronic elements. The base of the PCB can be phenolic sheets, glass fabric sheets or various plastic sheets. For example, the base of the FR-4 substrate is formed by epoxy glass fabric sheets.

The flexible printed circuit (FPC) is light, thin, soft and flexible, and has been widely used in many electronic products such as mobile phones, notebook computers, PDAs, digital cameras and liquid crystal displays (LCDs).

Figure 1:
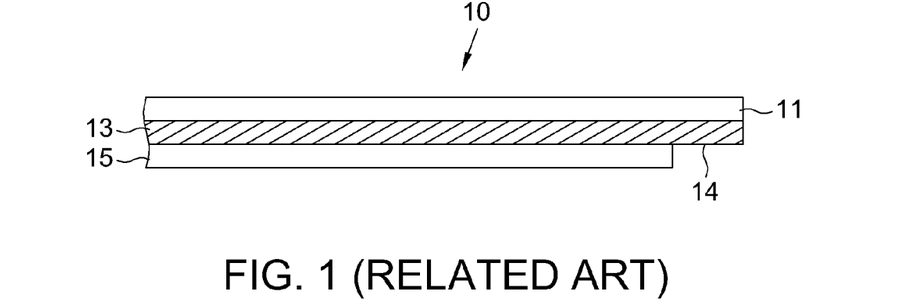
FIG. 1 shows a cross-sectional side view of a conventional FPC with a single-layered conductive copper foil.

Referring to FIG. 1, a cross-sectional side view of a conventional FPC with a single-layered conductive copper foil is shown. The FPC 10 includes a base 11, a copper foil layer 13, and a covering layer 15. The copper foil layer 13 has a bonding portion 14. The covering layer 15 covers the copper foil layer 13 and exposes the bonding portion 14, so that the FPC 10 is bonded with a rigid circuit board (not illustrated) via the bonding portion 14 by way of bonding process which is commonly used for bonding a conventional flexible substrate and a rigid substrate. However, the bonding area of the bonding portion 14 is restricted by the layout spaces of the electronic elements on the substrate, so that the bonding strength between two substrates is too weak to resist the pulling force during the assembly process. As a consequence, problems such as substrate detachment and poor contact may occur easily.

SUMMARY OF THE INVENTION

The invention is directed to a substrate and a substrate bonding device using the same. Through the design of double- or multi-layered metal layer of the substrate, the bonding area between the substrate and another substrate is increased, so that the bonding strength between two substrates is increased, and problems such as substrate detachment and poor contact are avoided.

According to a first aspect of the present invention, a substrate connected to another substrate is provided. The another substrate has two bonding portions which are insulated with each other. The substrate includes a base, a lower metal layer, a lower covering layer, an upper metal layer and an upper covering layer. The base has an upper surface, a lower surface, and a through hole which passes through the upper surface and the lower surface. The lower metal layer is disposed on the lower surface of the base, and has an electrical bonding portion and a strengthening bonding portion which are insulated with each other. The strengthening bonding portion is used for enhancing the bonding strength between the substrate and the another substrate. The lower covering layer covers the lower metal layer and exposes the electrical bonding portion and the strengthening bonding portion, so that the electrical bonding portion and the strengthening bonding portion are respectively bonded with two bonding portions of the another substrate. The upper metal layer is disposed on the upper surface of the base and electrically connected to the electrical bonding portion via the through hole. The upper covering layer covers the upper metal layer.

According to a second aspect of the present invention, a substrate bonding device including a first substrate and a second substrate is provided. The first substrate has a first electrical bonding portion and a first strengthening bonding portion which are insulated with each other. The second substrate includes a base, a lower metal layer, a lower covering layer, an upper metal layer, and an upper covering layer. The base has an upper surface, a lower surface, and a through hole passing through the upper surface and the lower surface. The lower metal layer is disposed on the lower surface of the base, and has a second electrical bonding portion and a second strengthening bonding portion which are insulated with each other. The lower covering layer covers the lower metal layer and exposes the second electrical bonding portion and the second strengthening bonding portion, so that the second electrical bonding portion and the second strengthening bonding portion are bonded with the first electrical bonding portion and the first strengthening bonding portion respectively. The upper metal layer is disposed on the upper surface of the base, and electrically connected to the second electrical bonding portion via the through hole. The upper covering layer covers the upper metal layer. The first and the second strengthening bonding portions are bonded with each other for enhancing the bonding strength between the first substrate and the second substrate.

The above and other aspects of the invention will become better understood with regard to the following detailed description of the exemplary but non-limiting embodiment(s). The following description is made with reference to the accompanying drawings.

DETAILED DESCRIPTION OF THE INVENTION

According to a substrate and a substrate bonding device using the same of an exemplary embodiment of the invention, the design of double- or multi-layered metal layer increases the bonding area between the substrate and another substrate for enhancing the bonding strength between two substrates. In dependence of the number of layers of the substrate, the FPC can be sorted into a single-layered board, a double-sided board, a double-layered board, or a multi-layered board. The substrate of the exemplary embodiment of the invention is exemplified by a double-layered board, but the invention is not limited thereto. Any designs of the substrate whose metal layer has two or more than two layers are within the scope of protection of the invention.

Figure 2:
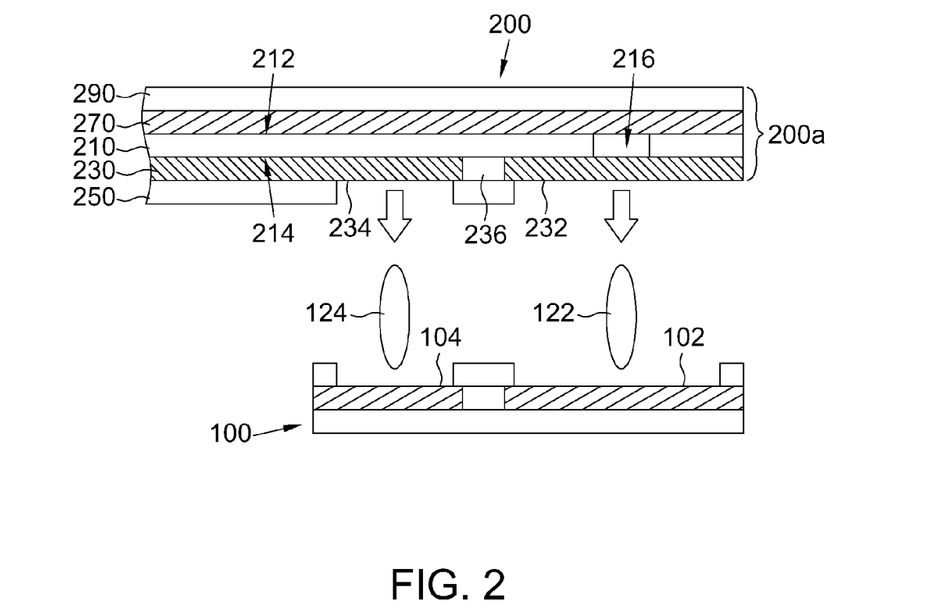
FIG. 2 shows a cross-sectional side view of a substrate, bonded with another substrate, according to an exemplary embodiment of the invention.

Referring to FIG. 2, a cross-sectional side view of substrate, bonded with another substrate, according to an exemplary embodiment of the invention is shown. The substrate 200 includes a base 210, a lower metal layer 230, a lower covering layer 250, an upper metal layer 270 and an upper covering layer 290. Preferably, the base 210 is formed by a flexible material, and the lower metal layer 230 and the upper metal layer 270 form a double-layered copper structure, so that the substrate 200 becomes a flexible substrate with a double-layered copper structure. The base 210 has an upper surface 212, a lower surface 214, and a through hole 216 passing through the upper surface 212 and the lower surface 214. The lower metal layer 230 is disposed on the lower surface 214 of the base 210, and has an electrical bonding portion 232 and a strengthening bonding portion 234 which are insulated with each other.

The lower metal layer 230 further has an insulation region 236 disposed between the electrical bonding portion 232 and the strengthening bonding portion 234 for electrically insulating the electrical bonding portion 232 and the strengthening bonding portion 234. The lower covering layer 250 covers the lower metal layer 230 and exposes the electrical bonding portion 232 and the strengthening bonding portion 234. The upper metal layer 270 is disposed on the upper surface 212 of the base 210, and electrically connected to the electrical bonding portion 232 via the through hole 216. Preferably, the upper metal layer 270 is a circuit distribution structure, which forms an electrical connection structure with the through hole 216 and the electrical bonding portion 232. The upper covering layer 290 covers the upper metal layer 270. Besides, another substrate 100 has two bonding portions 102 and 104 which are insulated with each other. In addition, the substrate 200 has an edge to which the electrical bonding portion 232 and the strengthening bonding portion 234 are adjacent, wherein the electrical bonding portion 232 is located between the edge and the strengthening bonding portion 234. That is, the distance between the strengthening bonding portion 234 and the edge is larger than that between the electrical bonding portion 232 and the edge.

When the substrate 200 and another substrate 100 are bonded along the arrow direction of FIG. 2, the electrical bonding portion 232 and the strengthening bonding portion 234, which are exposed by the lower covering layer 250, are bonded with the two bonding portions 102 and 104 of the another substrate 100 via the solders 122 and 124 respectively. The electrical bonding portion 232 and the strengthening bonding portion 234 can be realized by two first solder points, and the two bonding portions of the another substrate 100 can be realized by two second solder points, wherein the two second solder points correspond to the two first solder points respectively. Preferably, the strengthening bonding portion 234 includes a dummy solder joint. In addition, the substrate 200 can be realized by a power cable, and the electrical bonding portion 232 can be realized by an edge connector.

Furthermore, the bonding between the electrical bonding portion 232 and the bonding portion 102 enables the substrate 200 to be electrically connected to the another substrate 100, and the bonding between the strengthening bonding portion 234 and the bonding portion 104 enhances the bonding strength between the substrate 200 and the another substrate 100.

First Embodiment

Figure 3A:
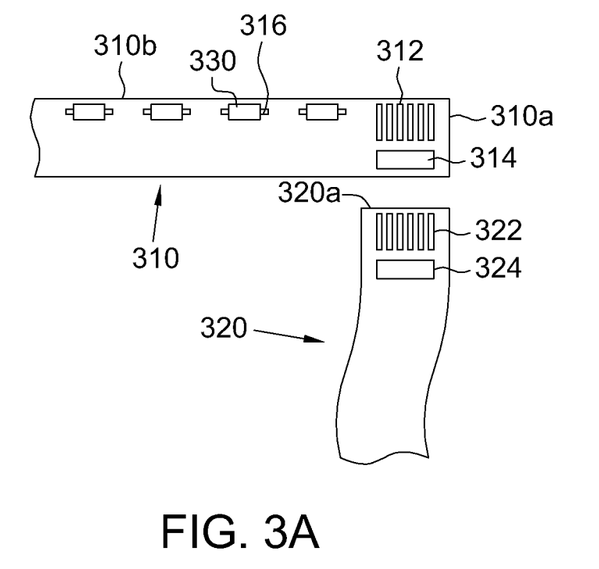
FIGS. 3A and 3B are two diagrams showing a substrate bonding device according to a first embodiment of the invention.
Figure 3B:
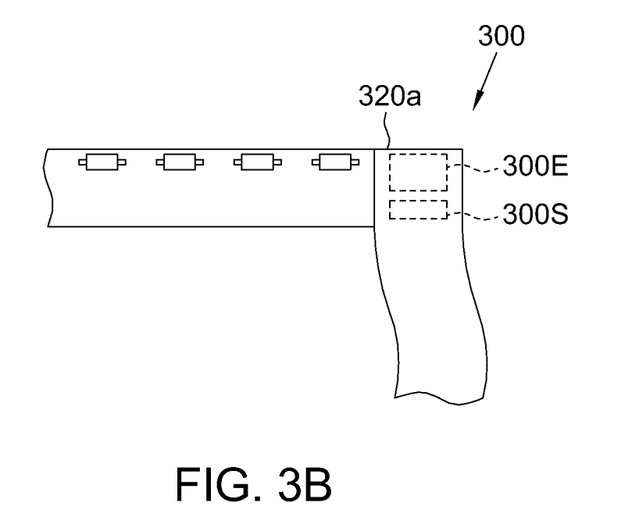

Referring to FIGS. 3A and 3B, two diagrams of a substrate bonding device according to a first embodiment of the invention are shown. The substrate bonding device 300 includes a first substrate 310 and a second substrate 320. The first substrate 310 can be realized by a rigid substrate, and the second substrate 320 can be realized by a flexible substrate. As indicated in FIG. 3A, the first substrate 310 has a first electrical bonding portion 312 and a first strengthening bonding portion 314 which are insulated with each other, and the second substrate 320 has a second electrical bonding portion 322 and a second strengthening bonding portion 324 which are insulated with each other.

Note that, the second substrate 320 of the present embodiment of the invention can be realized by the substrate 200 of FIG. 2 which has a double- or a multi-layered metal structure. The first substrate 310 of the present embodiment of the invention can be realized by the substrate 100 of FIG. 2 which has a single-layered metal structure. However, the invention is not limited thereto, and the first substrate 310 of the present embodiment of the invention can also be realized by a double- or a multi-layered metal structure in dependence of actual needs. Preferably, the first electrical bonding portion 312 and the first strengthening bonding portion 314 are realized by two second solder points, and the second electrical bonding portion 322 and the second strengthening bonding portion 324 are realized by two first solder points, wherein the two first solder points respectively correspond to the two second solder points respectively. Besides, the first strengthening bonding portion 314 and the second strengthening bonding portion 324 are such as two dummy solder joints corresponding to each other.

In FIG. 3A, the first substrate 310 has a short side 310a and two opposite long sides 310b connected to the short side 310a. The first electrical bonding portion 312 and the first strengthening bonding portion 314 are adjacent to short side 310a and further respectively adjacent to the two long sides 310b. Besides, the second substrate 320 has an edge 320a to which the second electrical bonding portion 322 and the second strengthening bonding portion 324 are adjacent, wherein the second electrical bonding portion 322 is located between edge 320a and the second strengthening bonding portion 324. That is, the distance between the second strengthening bonding portion 324 and the edge 320a is larger than that between the second electrical bonding portion 322 and the edge 320a. The first substrate 310 is preferably a light bar and further has a plurality of light source connection portions 316 and a plurality of light sources 330 disposed on the light source connection portions 316. The second substrate 320 is preferably realized by a power cable, and the second electrical bonding portion 322 is realized by an edge connector.

The second electrical bonding portion 322 and the second strengthening bonding portion 324 of the second substrate 320 are respectively bonded with the first electrical bonding portion 312 and the first strengthening bonding portion 314 of the first substrate 310 to form a substrate bonding device 300 of FIG. 3B. The first and the second electrical bonding portions 312 and 322 are bonded to form an electrical bonding region 300E for providing a bonding strength and electrical connection between the first and the second substrates 310 and 320. Moreover, the strengthening bonding region 300S, formed by way of bonding the first and the second strengthening bonding portions 314 and 324, further enhances the bonding strength between the first and the second substrates 310 and 320.

The substrate bonding device of the first embodiment of the invention is double-bonded via both the electrical bonding region 300E and the strengthening bonding region 300S, so that the bonding area between two substrates is increased for enhancing the substrate bonding strength of the substrate bonding device 300 without affecting the layout spaces of the electronic elements, and substrate detachment is thus effectively avoided. The electrical bonding region 300E is located between the edge 320a and the strengthening bonding region 300S. As a result, when the substrate bonding device 300 is pulled by an external force supplied from the second substrate 320 during the assembly process, the strengthening bonding region 300S will resist the external force and protect the electrical bonding region 300E from impact of the external force, so that the likelihood of poor contact occurred is effectively reduced.

Second Embodiment

Figure 4A:
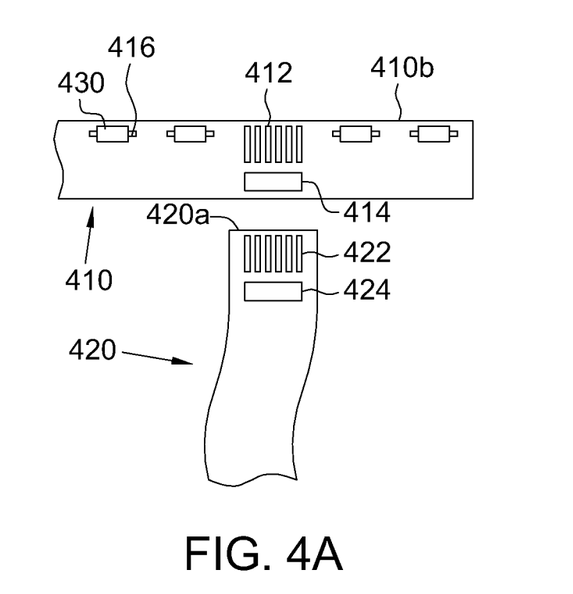
FIGS. 4A and 4B are two diagrams showing a substrate bonding device according to a second embodiment of the invention.
Figure 4B:
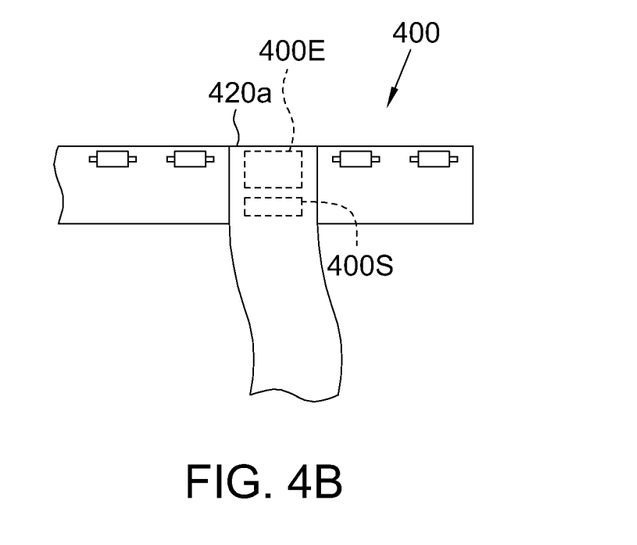

Referring to FIGS. 4A and 4B, two diagram of a substrate bonding device according to a second embodiment of the invention are shown. The substrate bonding device 400 of the present embodiment of the invention is different from the substrate bonding device 300 of the first embodiment in the bonding position between the first substrate and the second substrate, and other features similar to the first embodiment are not repeated here. In FIG. 4A, the first substrate 410 has two opposite long sides 410b to which the first electrical bonding portion 412 and the first strengthening bonding portion 414 are adjacent respectively. Besides, the second substrate 420 has an edge 420a to which the second electrical bonding portion 422 and the second strengthening bonding portion 424 are adjacent, wherein the second electrical bonding portion 422 is located between the edge 420a and the second strengthening bonding portion 424. The first substrate 410 is preferably a light bar, and further has a plurality of light source connection portions 416 and a plurality of light sources 430 disposed on the light source connection portions 416. Preferably, the second substrate is realized by a power cable, and the second electrical bonding portion 422 is realized by an edge connector.

The second electrical bonding portion 422 and the second strengthening bonding portion 424 of the second substrate 420 are respectively bonded with the first electrical bonding portion 412 and the first strengthening bonding portion 414 of the first substrate 410 to form a substrate bonding device 400 of FIG. 4B. The first and the second electrical bonding portions 412 and 422 are bonded to form an electrical bonding region 400E for providing a bonding strength and electrical connection between the first and the second substrates 410 and 420. Moreover, the strengthening bonding region 400S, formed by way of bonding the first and the second strengthening bonding portions 414 and 424, further enhances the bonding strength between the first and the second substrates 410 and 420.

Thus, the substrate bonding device of the second embodiment of the invention is double-bonded via both the electrical bonding region 400E and the strengthening bonding region 400S, so that the bonding area between two substrates is increased for enhancing the substrate bonding strength of the substrate bonding device 400 without affecting the layout spaces of the electronic elements, and substrate detachment is thus effectively avoided. The electrical bonding region 400E is located between the edge 420a and the strengthening bonding region 400S. As a result, when the substrate bonding device 400 is pulled by an external force supplied from the second substrate 420 during the assembly process, the strengthening bonding region 400S will resist the external force and protect the electrical bonding region 400E from impact of the external force, so that the likelihood of poor contact occurred is effectively reduced.

Third Embodiment

Figure 5A:
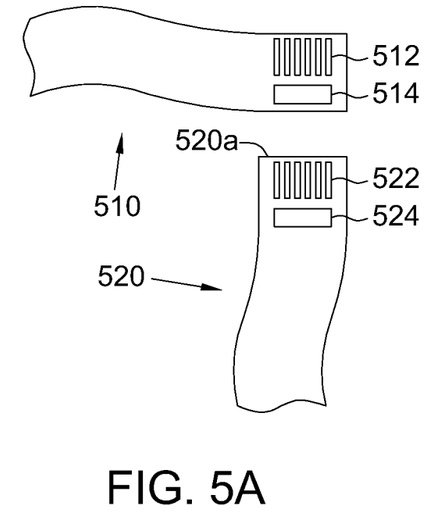
FIGS. 5A and 5B are two diagrams showing a substrate bonding device according to a third embodiment of the invention.
Figure 5B:
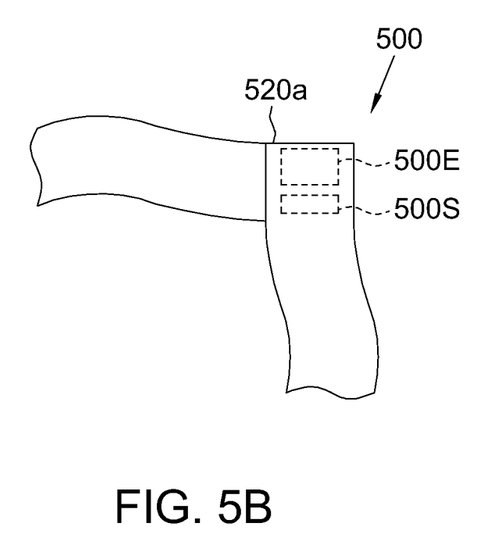

Referring to FIGS. 5A and 5B, two diagrams of a substrate bonding device according to a third embodiment of the invention are shown. The substrate bonding device 500 of the present embodiment of the invention is different from the substrate bonding device 300 of the first embodiment in the substrate type of the first substrate, and other features similar to the first embodiment are not repeated here. The substrate bonding device 500 includes a first substrate 510 and a second substrate 520. The first substrate 510 and the second substrate 520 can both be realized by a flexible substrate.

The second electrical bonding portion 522 and the second strengthening bonding portion 524 of the second substrate 520 of FIG. 5A are respectively bonded with the first electrical bonding portion 512 and the first strengthening bonding portion 514 of the first substrate 510 of FIG. 5A to form a substrate bonding device 500 of FIG. 5B. The first and the second electrical bonding portion 512 and 522 are bonded to form an electrical bonding region 500E for providing a bonding strength and electrical connection between the first and the second substrates 510 and 520. Moreover, the strengthening bonding region 500S, formed by way of bonding the first and the second strengthening bonding portions 514 and 524, further enhances the bonding strength between the first and the second substrates 510 and 520.

The substrate bonding device of the third embodiment of the invention is double-bonded via both the electrical bonding region 500E and the strengthening bonding region 500S, so that the bonding area between two substrates is increased for enhancing the substrate bonding strength of the substrate bonding device 500 without affecting the layout spaces of the electronic elements, and substrate detachment is thus effectively avoided. The electrical bonding region 500E is located between the edge 520a and the strengthening bonding region 500S. As a result, when the substrate bonding device 500 is pulled by an external force supplied from the second substrate 520 during the assembly process, the strengthening bonding region 500S will resist the external force and protect the electrical bonding portion 500E from impact of the external force, so that the likelihood of poor contact occurred is effectively reduced.

According to the substrate and the substrate bonding device using the same disclosed in the above embodiments of the invention, the bonding area between the substrate and another substrate is increased through the design of double- or multi-layered metal layer of the substrate. Through the double bonding provided by the electrical bonding region and the strengthening bonding region, the bonding strength between two substrates is enhanced without affecting the layout spaces of the electronic elements, and substrate detachment is thus effectively avoided. When the substrate bonding device is pulled by an external force during the assembly process, the strengthening bonding region will resist the external force, so that the electrical bonding region will not directly receive the impact of the external force, and the likelihood of poor contact occurred will be effectively reduced.

While the invention has been described by way of example and in terms of the exemplary embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A substrate, connected to another substrate, wherein the another substrate has two bonding portions which are insulated from each other, and the substrate comprises:
   a base having an upper surface, a lower surface and a through hole, wherein the through hole passes through the upper surface and the lower surface;
   a lower metal layer disposed on the lower surface of the base, wherein the lower metal layer has an insulation region, an electrical bonding portion and a strengthening bonding portion, wherein the electrical bonding portion and the strengthening bonding portion are electrically insulated from each other by the insulation region, and the strengthening bonding portion enhances the bonding strength between the substrate and the another substrate;
   a lower covering layer covering the lower metal layer and exposing the electrical bonding portion and the strengthening bonding portion for respectively bonding the electrical bonding portion and the strengthening bonding portion with the two bonding portions of the another substrate;
   an upper metal layer disposed on the upper surface of the base and electrically connected to the electrical bonding portion via the through hole; and
   an upper covering layer covering the upper metal layer;
   wherein the substrate has an edge to which the electrical bonding portion and the strengthening bonding portion are adjacent, a part of the substrate that is close to the edge overlaps the another substrate, another part of the substrate that is away from the edge extends away from the another substrate, and the electrical bonding portion is located between the edge and the strengthening bonding portion.

2. The substrate according to claim 1, wherein the electrical bonding portion and the strengthening bonding portion are two first solder points, and the two bonding portions of the another substrate are two second solder points respectively correspond to the two first solder points.

3. The substrate according to claim 1, wherein the strengthening bonding portion comprises a dummy solder joint.

4. The substrate according to claim 1, wherein the insulation region is disposed between the electrical bonding portion and the strengthening bonding portion.

5. The substrate according to claim 1, wherein the lower metal layer and the upper metal layer form a double-layered copper structure.

6. The substrate according to claim 1, wherein the upper metal layer is an electric circuit pattern, which forms an electrical connection structure with the through hole and the electrical bonding portion.

7. The substrate according to claim 1, wherein the substrate is a power cable, and the electrical bonding portion is an edge connector.

8. The substrate according to claim 1, wherein the substrate is a flexible substrate.

9. A substrate bonding device, comprising:
   a first substrate having a first electrical bonding portion and a first strengthening bonding portion which are insulated from each other; and
   a second substrate, comprising:
      a base having an upper surface, a lower surface and a through hole, wherein the through hole passes through the upper surface and the lower surface;
      a lower metal layer disposed on the lower surface of the base, wherein the lower metal layer has an insulation region, a second electrical bonding portion and a second strengthening bonding portion, wherein the second electrical bonding portion and the second strengthening bonding portion are electrically insulated from each other by the insulation region;
      a lower covering layer covering the lower metal layer and exposing the second electrical bonding portion and the second strengthening bonding portion for respectively bonding the second electrical bonding portion and the second strengthening bonding portion with the first electrical bonding portion and the first strengthening bonding portion;
      an upper metal layer disposed on the upper surface of the base and electrically connected to the second electrical bonding portion via the through hole; and
      an upper covering layer covering the upper metal layer;
   wherein the first and the second strengthening bonding portions are bonded with each other for enhancing the bonding strength between the first substrate and the second substrate; and
   wherein the second substrate has an edge to which the second electrical bonding portion and the second strengthening bonding portion are adjacent, a part of the second substrate that is close to the edge overlaps the first substrate, another part of the second substrate that is away from the edge extends away from the first substrate, and the second electrical bonding portion is located between the edge and the second strengthening bonding portion.

10. The substrate bonding device according to claim 9, wherein the first substrate has a short side and two opposite long sides connected to the short side, the first electrical bonding portion and the first strengthening bonding portion are adjacent to the short side and further respectively adjacent to the two opposite long sides.

11. The substrate bonding device according to claim 9, wherein the first substrate has two opposite long sides to which the first electrical bonding portion and the first strengthening bonding portion are respectively adjacent.

12. The substrate bonding device according to claim 9, wherein the second electrical bonding portion and the second strengthening bonding portion are two first solder points, the first electrical bonding portion and the first strengthening bonding portion are two second solder points, and the two first solder points respectively correspond to the two second solder points.

13. The substrate bonding device according to claim 9, wherein the second strengthening bonding portion and the first strengthening bonding portion are two dummy solder joints corresponding to each other.

14. The substrate bonding device according to claim 9, wherein the insulation region is disposed between the second electrical bonding portion and the second strengthening bonding portion.

15. The substrate bonding device according to claim 9, wherein the lower metal layer and the upper metal layer form a double-layered copper structure.

16. The substrate bonding device according to claim 9, wherein the upper metal layer is an electric circuit pattern, which forms an electrical connection structure with the through hole and the second electrical bonding portion.

17. The substrate bonding device according to claim 9, wherein the first substrate is a light bar, and the first substrate further has a plurality of light source connection portions and a plurality of light sources disposed on the light source connection portions.

18. The substrate bonding device according to claim 9, wherein the second substrate is a power cable, and the second electrical bonding portion is an edge connector.

19. The substrate bonding device according to claim 9, wherein the first substrate is a flexible substrate or a rigid substrate.

20. The substrate bonding device according to claim 9, wherein the second substrate is a flexible substrate.

21. A substrate, connected to another substrate, wherein the another substrate has two bonding portions which are insulated from each other, and the substrate comprises:
- a base having an upper surface, a lower surface and a through hole, wherein the through hole passes through the upper surface and the lower surface;
- a lower metal layer disposed on the lower surface of the base, wherein the lower metal layer has an insulation region, an electrical bonding portion and a strengthening bonding portion, wherein the electrical bonding portion and the strengthening bonding portion are electrically insulated from each other by the insulation region, wherein the electrical bonding portion comprises a group of electrical bonding units, wherein an extending direction of the electrical bonding units is different from an extending direction of the strengthening bonding portion, and the strengthening bonding portion enhancesing the bonding strength between the substrate and the another substrate;
- a lower covering layer covering the lower metal layer and exposing the electrical bonding portion and the strengthening bonding portion for respectively bonding the electrical bonding portion and the strengthening bonding portion with the two bonding portions of the another substrate;
- an upper metal layer disposed on the upper surface of the base and electrically connected to the electrical bonding portion via the through hole; and
- an upper covering layer covering the upper metal layer.

22. The substrate according to claim 21, wherein the extending direction of the electrical bonding units is substantially orthogonal to the extending direction of the strengthening bonding portion.

23. A substrate, connected to another substrate, wherein the another substrate has two bonding portions which are insulated from each other, and the substrate comprises:
- a base having an upper surface, a lower surface and a through hole, wherein the through hole passes through the upper surface and the lower surface;
- a lower metal layer disposed on the lower surface of the base, wherein the lower metal layer has an insulation region, an electrical bonding portion and a strengthening bonding portion, wherein the electrical bonding portion and the strengthening bonding portion are electrically insulated from each other by the insulation region, and the strengthening bonding portion enhances the bonding strength between the substrate and the another substrate;
- a lower covering layer covering the lower metal layer and exposing the electrical bonding portion and the strengthening bonding portion for respectively bonding the electrical bonding portion and the strengthening bonding portion with the two bonding portions of the another substrate;
- an upper metal layer disposed on the upper surface of the base and electrically connected to the electrical bonding portion via the through hole; and
- an upper covering layer covering the upper metal layer;
- wherein the substrate extends in a direction different from an extending direction of the another substrate.

* * * * *